US005352317A

United States Patent [19]

Traben et al.

[11] Patent Number: 5,352,317

[45] Date of Patent: Oct. 4, 1994

[54] METHOD OF PREPARING A MULTILAYERED SOLID WOOD PANEL

[75] Inventors: Josef Traben; Siegmar Goenner, both of Oberkirch, Fed. Rep. of Germany

[73] Assignee: Firma Gebruder Linck Maschinenfabrik "Gatterlinck" GmbH & Co. KG, Oberkirch, Fed. Rep. of Germany

[21] Appl. No.: 608,973

[22] Filed: Nov. 1, 1990

[30] Foreign Application Priority Data

Nov. 1, 1989 [DE] Fed. Rep. of Germany ....... 3936312

[51] Int. Cl.[5] .............................................. B32B 31/18

[52] U.S. Cl. .................................... 156/254; 156/264; 144/3 N; 144/3 P; 144/3 R; 144/39; 144/120; 144/159; 144/184; 144/367; 144/369

[58] Field of Search ............... 156/254, 255, 264, 266; 144/3 P, 159, 184, 120, 207, 3 N, 3 R, 39, 367, 369

[56] References Cited

U.S. PATENT DOCUMENTS

| | | | |
|---|---|---|---|
| 2,763,069 | 9/1956 | Vaughan | 34/28 |
| 3,750,303 | 8/1973 | Gates et al. | 34/95 |
| 4,143,692 | 3/1979 | Traben | 344/323 |
| 4,185,672 | 1/1980 | Vit et al. | 144/312 |
| 4,220,185 | 9/1980 | Traben | 344/323 |
| 4,362,197 | 12/1982 | Wick et al. | 144/364 |
| 4,516,526 | 5/1985 | Drockila | 118/697 |
| 4,589,456 | 5/1986 | Traben | 144/3 P |
| 4,825,917 | 5/1989 | Gönner | 144/3 P |
| 5,002,106 | 3/1991 | Binder | 144/120 |

FOREIGN PATENT DOCUMENTS

| | | | |
|---|---|---|---|
| 1091135 | 12/1980 | Canada . | |
| 1097193 | 3/1981 | Canada . | |
| 375807 | 7/1990 | European Pat. Off. . | |
| 376918 | 7/1990 | . | |
| 2124086 | 11/1972 | Fed. Rep. of Germany . | |
| 2124086 | 11/1972 | Fed. Rep. of Germany | 156/255 |
| WO88/00517 | 1/1988 | PCT Int'l Appl. . | |

*Primary Examiner*—Caleb Weston
*Attorney, Agent, or Firm*—Marshall, O'Toole, Gerstein, Murray & Borun

[57] ABSTRACT

A method of preparing a multilayered wood panel from thin boards is disclosed. The thin boards are produced by from square timber by a knife cut.

18 Claims, 1 Drawing Sheet

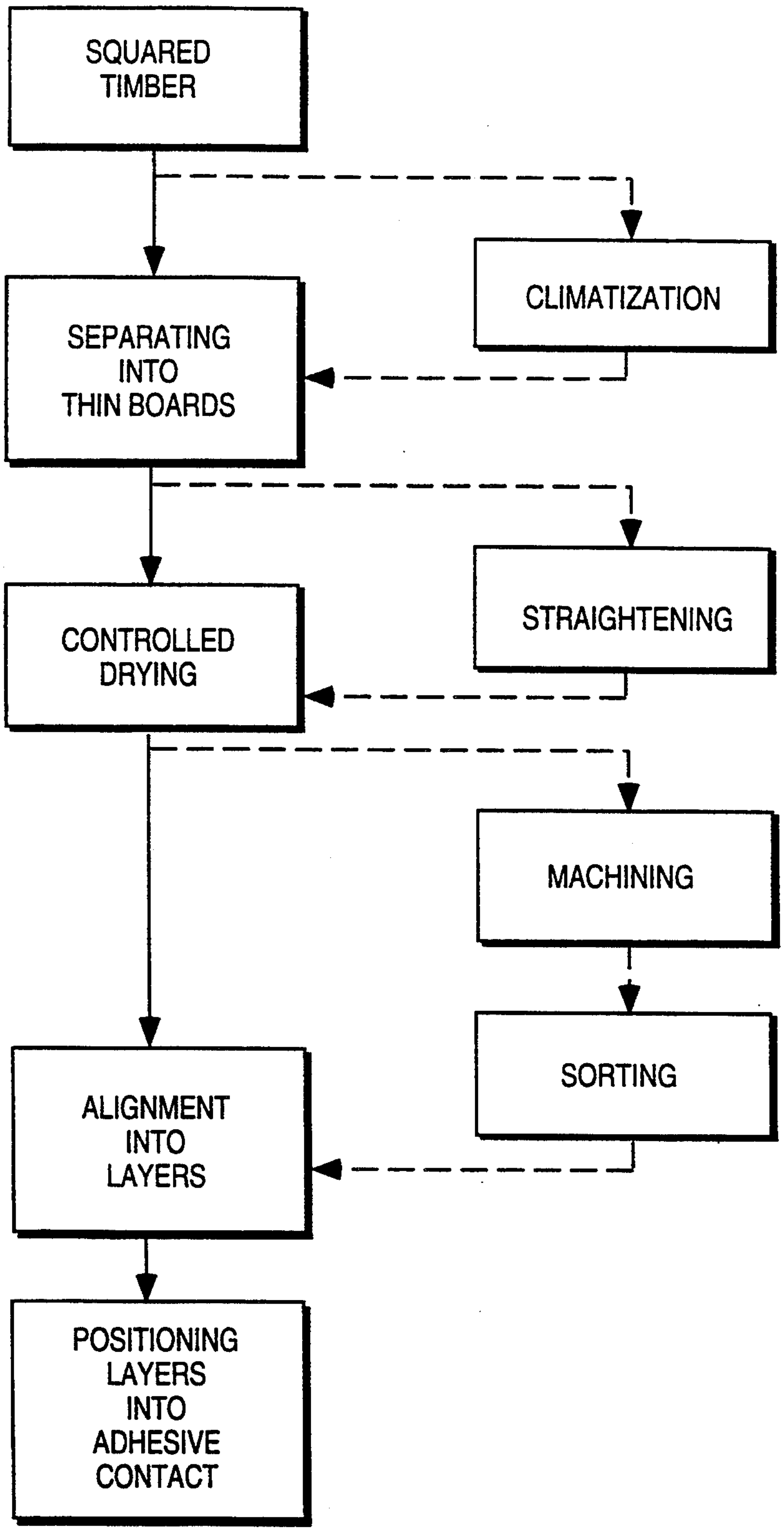
SQUARED TIMBER
CLIMATIZATION
SEPARATING INTO THIN BOARDS
STRAIGHTENING
CONTROLLED DRYING
MACHINING
SORTING
ALIGNMENT INTO LAYERS
POSITIONING LAYERS INTO ADHESIVE CONTACT

METHOD OF PREPARING A MULTILAYERED SOLID WOOD PANEL

FIELD OF THE INVENTION

The present invention is directed to a method of preparing a multilayered solid wood panel, or a similar multilayered laminated product, wherein the multilayered laminated product comprises thin boards separated from a squared timber by a knife cut.

BACKGROUND OF THE INVENTION

Composite wood panels and similar panels are produced by securing, usually with glue, at least two, and generally three or more, layers of relatively thin boards. Compared to solid wood boards, such composite wood panels have advantages. For example, composite wood panels can be produced having a desired surface area that is not limited by the diameter of the trunk of a tree. Basically, any limitations with regard to the size of the surface area of the composite panel arise only from problems in handling the panels. Furthermore, composite wood panels demonstrate superior strength properties compared to normal solid wood boards that are not glued because, by transverse gluing of the boards, the direction-dependent strength properties of wood can be partially compensated and, as a result, changes of board shape due to the influence of environmental factors, like moisture, can be kept within prescribed limits.

A disadvantage in the present production of such multilayered solid wood panels is that an excess amount of wood starting material must be used because the production process involves a large amount of wood waste. Accordingly, such composite wood panels are correspondingly much more expensive. For example, if thin initial boards are used to manufacture the multilayer composite panel, the squared timber must undergo more saw cuts to produce to these thin boards. Therefore, depending on the desired thickness of the initial thin board, the saw cuts produce a large amount of unusable sawdust, that can represent 25–40% of the amount of the initial wood.

This large amount of waste wood is avoided in the production of particle boards, wherein the wood is reduced to small particles that then are pressed into boards with the aid of a binder. The manufacture of particle boards permits significantly improved raw material utilization, but the strength properties and the surface qualities of particle boards do not favorably compare to those of wood itself. In addition, the manufacture of particle board requires the use of a large amount of binder, that in turn presents environmental and health problems because most binders contain formaldehyde.

Therefore, an important aspect of the present invention is to provide a method of preparing multilayered solid wood panels, and similar multilayer laminated products, wherein the initial raw material, like wood, can be utilized with significantly less waste generation than was possible in the previous conventional methods of preparing laminated products. In addition, the multilayered solid wood panels manufactured by the present method still possess qualities and properties that are comparable to or even better than the qualities and properties of composite wood panels made from boards produced by a sawing method. This aspect of the invention is achieved by providing thin wood boards from squared timber by a knife cut, and by securing the thin boards to one another in a particular manner as fully described below to provide a multilayered solid wood panel.

BRIEF DESCRIPTION OF THE FIGURE

The sole FIGURE is a flow sheet depicting a method of producing a multilayered wood panel according to the invention with preferred but optional steps depicted in phantom line.

DETAILED DESCRIPTION OF A PREFERRED EMBODIMENT

A preferred embodiment of the method of the invention will be described below with the steps of the method illustrated in the flow sheet of the figure wherein preferred but optional steps are depicted in phantom line.

By using thin boards that are produced in a method utilizing cutting with a knife or a blade, as opposed to sawing, the thin boards from a squared timber, it is possible to utilize essentially 100% of the volume of the squared timber in the production of composite wood panels. Although a tree trunk first is transformed into squared timber in an identical way as when a squared timber is sawed, this waste can be utilized as has been done in the art for a long time, that is, in the form of wood chips that can be used in the pulp industry.

In the present invention, the term "lamella-like boards" means relatively thin and narrow boards having a thickness of from about 2 millimeters to about 15 millimeters, and preferably a thickness in the range from about 6 to about 12 millimeters; having a width in the range from about 5 to about 30 centimeters, and preferably in the range of from about 10 to about 12 centimeters; and having a length that is at least a multiple of the width, and preferably more than 10 times the width. The production of such thin boards by cutting squared timber is known, and for example is described in U.S. Pat. Nos. 4,143,692 and 4,220,185. In this method, a thin board separated from the squared timber is removed in the direction of the knife angle and thus necessarily assumes a certain curvature. Therefore, the limit of the thickness of a thin board produced by this knife-cutting method is about 15 millimeters. Originally, it was believed that thin boards produced by the cutting method could be used substantially only in those applications where accuracy of dimensions and certain surface quality are not required, for example in interwoven fencing and fruit crates. The use of knife-cut thin boards for higher quality wood products, especially for multilayer laminated panels, has neither been taught nor suggested.

Surprisingly, we have found that thin boards produced by cutting demonstrate differences in their surface strength, which in turn influences the strength of the laminated panels produced from the thin boards. Therefore, it was found that distinguishing between the two sides of a thin board produced by cutting is important. In accordance with the present invention, the two sides of a thin board produced by a knife cut are termed the "knife side" and the "opposite side". Of course, fundamentally each side of the thin board is cut by the knife, but the side that is termed the "knife side", according to the definition used here and hereinafter, is the side of the thin board being cut that is against the knife. The outer surface of the residual piece of square timber, which also contacts the knife, then is termed the "opposite side" of the next thin board to be separated from the piece of residual squared timber.

A thin board that is being separated from the squared timber is removed by twisting or bending the thin board along the inclination of the knife. Because the knife generally is strongly inclined with respect to the transfer direction of the squared timber, the cutting process obviously has a different influence on the side of the thin board to be separated that faces the knife, i.e. the "knife side", than the cutting surface that remains on the squared timber, i.e. the "opposite side", which is not subjected to any significant deformation. In contrast, the knife side undergoes a certain surface expansion. As a result of the different tension and extension relationships on the surfaces of the thin boards so produced, and as a result of the subsequent required straightening process for the thin boards, one obtains a thin board wherein the knife side has a slightly protruding unevenness, and wherein the opposite side has smaller surface depressions, and therefore is superior to the knife side with regard to tightness and strength.

Furthermore, it was found that, in order to produce thin boards having a surface quality that satisfies the requirements for the production of laminated wood panels, the cutting velocity used to produce the thin boards is of importance. The cutting velocity is the relative velocity between the knife and the squared timber. Although the thin boards are separated from the squared timber by the knife, and although the squared timber is under a considerable opposing pressure in order to avoid splitting of the wood ahead of the knife blade, it was found that, the surface quality of the thin boards is improved if the cutting velocity is greater, and preferably significantly greater, than the normal cracking velocity of the wood. For example, the surface quality of the thin boards is improved when the squared timber is separated into thin boards at a cutting velocity of more than about 50 meters per minute, and preferably at a cutting velocity of from about 90 to about 140 meters per minute.

In addition, in order to produce a high quality thin board, the squared timber to be cut requires a certain minimum moisture content. It has been found that the moisture content of the squared timber should be at least 30 weight percent, and preferably at least 40 weight percent. If the virgin squared timber does not include sufficient moisture, the virgin squared timber should be treated previous to cutting by a climatization treatment. The climatization treatment comprises a steam treatment.

It also is advantageous to the present method to treat the wood by raising the temperature of the squared timber. The treatment temperature should be about 40° C. or greater, and preferably the treatment temperature is about 60° C. or greater. As a result of this elevated temperature treatment, the lignin in the wood becomes easily plasticized, that in turn provides better cutting for higher quality thin boards.

Furthermore, it is advantageous to subject the thin boards that exit from the cutting machine to a straightening procedure before the thin boards are processed further. As a result of the straightening procedure, the curvature of the thin board caused by the cutting process, which is mostly a biaxial curvature, can be eliminated. A suitable straightening apparatus that is positioned immediately after the cutting apparatus is described, for example, in European Patent Publication No. 144 003.

In addition, in the preparation of laminated wood panels, it is advantageous, after cutting, to bring the high moisture content of the thin boards down to a moisture content that is suitable for further processing. The moisture content of the thin boards should be reduced, such as by drying, to less than 15 weight percent, and preferably to between about 6 and about 12 weight percent.

Although the thin boards generally are subjected to a straightening process immediately after cutting, a thin board still can demonstrate a certain degree of warping. It was shown that such warping can be largely eliminated during the drying process if the thin boards are subjected to a sufficient surface load during the drying process. For example, warping is substantially eliminated by using a continuous dryer that has an upper jointed band that is placed on the thin boards and moves with the thin boards while the thin boards rest on a conveyor belt.

Optionally, if it is necessary for the further processing of the thin boards, the surface structure of the thin boards can be equalized by a slight grinding of the thin boards after drying. However, the amount of wood removed by grinding should not exceed about 0.1 millimeter. As previously mentioned, the knife side of the thin boards can exhibit slight protrusions arising from the cutting process. However, according to the present invention, and as will be discussed more fully hereinafter, since the knife side of a thin board is not used on the outer surface of the composite panel, the unevenness of the knife side surface of the thin board is essentially nonperturbing because, at the high pressures at which the thin boards are glued together, the protrusions are either pressed together or pressed into the surface of the opposing panel. As a result, the adhesive effect between the thin boards can even be improved.

It also may be desirable for the thin boards to possess a certain sliding ability during a subsequent manufacturing process. In order to impart a sliding ability to the thin boards, slight extra grinding of the knife sides of the thin boards can be helpful. If composite wood panels with high surface quality are to be produced, and if intense final grinding of the composite panel is not performed, the opposite side of the thin boards can be given an extra grinding at this stage of the manufacturing process. Such an extra grinding step can be omitted if the opposite sides are subjected to grinding in a subsequent process step.

In order to ensure that the thin boards lie against one another in the layers of the composite panel without gaps, it is advantageous to trim the side edges of the thin boards. Trimming of the side edges can be performed by grinding, but planing or sawing the edges is more advantageous. This trimming of the edges must be done after the thin boards are dried because during the drying of the thin boards, the sides of the thin board can undergo different shrinkage due to the annual ring structure of the wood, and therefore the side edges of the thin boards may no longer be exactly perpendicular to the main surfaces. Perpendicularity then can be restored by trimming the side edges.

Depending upon the desired quality of the laminate composite panels to be produced, the thin boards can be sorted according to their optical surface structure, or according to absence of branches. For example, the sorting can be done into three classes, namely into boards of Class A, wherein the opposite side of the thin board is the front, or visual, side of the laminated panel to be produced; boards of Class B, wherein the opposite side of the thin board is the back side of the laminated panel; and boards of Class C, that are included in a middle layer of the laminated panel that has more than two layers. The thin boards that are to be used for the front side of the panel (Class A) also can be sorted, for example, according to the fitting of the wood grain structure, and can be secured together correspondingly.

After a sorting process, the opposite sides of at least those thin boards that are to form the front surface of the laminated panel can be ground, depending on the quality requirements for the end product. Grinding of the opposite side of the thin boards can be done to such an extent that all surface irregularities or surface depressions are eliminated in order to obtain absolutely smooth wood surfaces. However, if desired, the finishing grinding alternatively can be performed on the completed composite panel so that the grinding of the opposite side of the thin boards can be performed at this point in the manufacturing process.

In order to distinguish the knife side and opposite side of the thin boards, the thin boards are marked immediately after cutting, for example, with a colored marker. It is preferred that the colored mark is placed on the knife side of the thin board when a color is used that can penetrate sufficiently into the wood so that the color can be seen after grinding. The knife side of the thin boards is not used on the outside front surface of the composite panel, so any residual color marking is not visible. It also may be advantageous to remark the thin boards after grinding, or before placing the thin boards together to form a layer of the composite panel.

The thin boards that have been prepared as described above, then are positioned together such that the side edges of one thin board contact the side edges of the adjacent thin boards to form a layer of the subsequent composite panel. The thin boards are positioned in such a way that the opposite side of the thin boards form one surface of the board layer, and the knife side of the thin boards form the other surface of the layer. Depending on the sorted quality of the thin boards, the thin boards are joined to provide a front layer, a back layer and the intermediate layers of the composite panel. The joining and gluing of the thin boards to form a layer of the composite panel is performed in a manner well-known to those skilled in the art. In accordance with the present invention however, care must be taken that the front surface of each layer of the composite panel is formed from the opposite side of the thin boards. When forming the individual panel layers, the glue can be applied to the side edges of the thin board. However, this gluing often is not a necessary step because when the layers of the thin boards are pressed to form the composite panel, the glue that is applied between the layers of the thin boards generally penetrates into the gaps between the thin board edges. The layers of the thin boards comprising a composite panel are placed in a laminar configuration on top of one another, with intermediate glue layers applied between each layer of thin boards. The layers of thin boards are positioned such that the longitudinal directions of the thin boards of the thin boards of adjacent layers are at an angle to one another. In general, the thin boards of adjacent layers are arranged at right angles, but one can also form laminates in which the thin boards of the adjacent layers form an acute angle with one another.

The stack of thin board layers and glue is then pressed in a suitable press, optionally with the application of heat. The glue is allowed to set, and the desired multilayer solid wood panel is formed. As known in the art, several panels can be produced in one pressing process by separating the individual stacks of thin board layers by sheet metal or similar material. Finally, the outside edges of the laminated panels are cleaned, and the entire surface of the laminated panel is ground to provide the desired surface quality.

We claim:

1. A method for the production of finished wood sheets from wood planks, comprising the steps of:

(a) sawdust-free cutting of the wood planks into individual wood sheets having predetermined dimensions;

(b) controlled drying of the individual wood sheets to a predetermined moisture content; and (c) subsequent machining of one or more sides of the dried wood sheets to form finished wood sheets.

2. The method according to claim 1, wherein the wood planks are preconditioned by drying to have a predetermined humidity to achieve uniform initial humidity prior to performing step (a).

3. The method according to claim 2, wherein the wood planks are preconditioned to have a humidity of at least 40%.

4. The method according to claim 1, wherein the cut wood sheets of step (b) are dried to a wood humidity within a range from 6 to 12%.

5. The method according to claim 1, wherein following step (a) the wood sheets are marked to designate respective major surfaces of said sheets with respect to their respective underside facing a cutting blade of a cutting apparatus for performing said sawdust-free cutting.

6. A method according to claim 5, further comprising a step of combining predetermined numbers of said finished wood sheets into a multilayer sheet wood product wherein a predetermined outside visible side of the multilayer sheet wood product is formed exclusively by closed sides of the finished wood sheets facing away from the cutting blade used in the cutting process.

7. The method according to claim 1, further including the step of monitoring a characteristic of each of said finished wood sheets and, in response, classifying and sorting said finished wood sheets following step (c).

8. The method according to claim 7, further including a step of stacking of said sorted wood sheets.

9. The method according to claim 7, wherein the sorted wood sheets are further processed by side gluing.

10. A method for the production of finished wood sheets or finished boards from wood planks or squared timber, comprising the steps of:

(a)(i) sawdust-free cutting of the wood planks or squared timber into individual wood sheets or boards having predetermined dimensions; or (ii) cutting of said wood planks or squared timber into individual wood sheets or boards having predetermined dimensions utilizing essentially 100% of the volume of the wood planks or squared timber;

(b) controlled drying of the individual wood sheets or boards to a predetermined moisture content; and (c) subsequent machining of one or more sides of the dried wood sheets or boards to form finished wood sheets or finished boards.

11. The method according to claim 9, wherein the wood planks or squared timber are preconditioned by drying to have a predetermined humidity to achieve uniform initial humidity prior to performing step (a).

12. The method according to claim 11, wherein the wood planks or squared timber are preconditioned to have a humidity of at least 40%.

13. The method according to claim 10, wherein the cut wood sheets or boards of step (b) are dried to a wood humidity within a range from 6 to 12%.

14. The method according to claim 10, wherein following step (a) the wood sheets or boards are marked to designate respective major surfaces of said wood sheets or boards with respect to their respective underside facing a cutting blade of a cutting apparatus for performing said cutting of step (a)(i) or step (a)(ii).

15. A method according to claim 14, further comprising a step of combining predetermined numbers of said finished wood sheets or finished boards into a multilayer sheet or board wood product wherein a predetermined outside visible side of the multilayer sheet or board wood product is formed exclusively by closed sides of the finished wood sheets or finished boards facing away from the cutting blade used in the cutting process.

16. The method according to claim 10, further including the step of monitoring a characteristic of each of said finished wood sheets or finished boards and, in response, classifying and sorting said finished wood sheets or finished boards following step (c).

17. The method according to claim 16, further including a step of stacking of said sorted wood sheets or boards.

18. The method according to claim 16, wherein the sorted wood sheets or boards are further processed by side gluing.

* * * * *